US005178949A

United States Patent [19]

Sakamoto et al.

[11] Patent Number: 5,178,949

[45] Date of Patent: Jan. 12, 1993

[54] COLOR-FORMER

[75] Inventors: Masahiro Sakamoto; Tsutomu Murano; Shozo Harada, all of Naka, Japan

[73] Assignee: Jujo Paper Co., Ltd., Tokyo, Japan

[21] Appl. No.: 703,784

[22] Filed: May 21, 1991

Related U.S. Application Data

[63] Continuation-in-part of Ser. No. 498,740, Mar. 26, 1990, abandoned.

[30] Foreign Application Priority Data

Mar. 27, 1989 [JP] Japan .................................. 1-74725

[51] Int. Cl.[5] ....................... B01J 13/02; B41M 5/165

[52] U.S. Cl. ................................ 428/402.2; 503/213; 503/214

[58] Field of Search ........... 428/402.2, 402.21, 402.22; 264/4.7; 503/213, 214

[56] References Cited

U.S. PATENT DOCUMENTS

| | | | |
|---|---|---|---|
| 3,016,308 | 1/1962 | Macaulay | 428/402.2 X |
| 3,427,180 | 2/1969 | Phillips, Jr. | 428/402.2 X |
| 3,535,139 | 10/1970 | Watanabe et al. | 428/402.2 X |
| 3,738,857 | 6/1973 | Brockett et al. | 428/402.2 X |
| 3,919,110 | 11/1975 | Vassiliades et al. | 428/402.22 |
| 4,016,099 | 4/1977 | Wellman et al. | 428/402.2 X |
| 4,630,079 | 12/1986 | Kosaka et al. | 428/402.21 X |
| 4,696,856 | 9/1987 | Okada et al. | 428/402.2 X |
| 4,879,175 | 11/1989 | Ugro, Jr. | 428/402.2 X |
| 4,882,259 | 11/1989 | O'Connor et al. | 428/402.2 X |

*Primary Examiner*—Robert L. Stoll
*Assistant Examiner*—John M. Covert
*Attorney, Agent, or Firm*—Sherman & Shalloway

[57] ABSTRACT

The present invention relates to a color-former having microcapsules which comprise an electron-donating colorless dye dispersed in a hydrophobic liquid. The present invention provides a color-former using both an electron-donating colorless dye and a hydrophobic liquid which previously were unable to be used because of the lack of solubility. A uniform and stable dispersion of electron-donating colorless dye in a hydrophobic core liquid is prepared by using oil-soluble non-ionic surfactant.

7 Claims, No Drawings

COLOR-FORMER

This application is a continuation-in-part of copending application Ser. No. 07/498,740, filed Mar. 26, 1990, now abandoned.

FIELD OF THE INVENTION

The present invention relates to a color-former, and more particularly, to a color-former used as a pressure-sensitive recording material and a temperature-indicating material under the application of microcapsules.

DESCRIPTION OF THE PRIOR ART

The recording materials using an electron-donating colorless dye are well known as pressure-sensitive recording papers, heat-sensitive recording papers, light-sensitive recording papers, electrical heat-sensitive recording papers, temperature-indicating papers and the like, as seen in British Patent 2,140,449, U.S. Pat. Nos. 4,480,052 and 4,436,920, Japanese Patent Publication No. 60-23922, Japanese Laid-Open Patent Application Nos. 57-179836, 60-123556 and 60-123557, etc.

These prior references disclose that various electron-donating colorless dyes are dissolved in microcapsules, and that the types of electron-donating colorless dyes and solvents which can be used to obtain the desired image density is limited. These references also disclose that the solvent is restricted to an aromatic solvent having a superior safety.

SUMMARY OF THE INVENTION

It is a principle object of the present invention to provide a color-former comprising both an electron-donating colorless dye and a hydrophobic liquid.

The above-mentioned object can be achieved by using, as a main raw material of the color-former, microcapsules containing an electron-donating colorless dye dispersed in a hydrophobic liquid.

DETAILED DESCRIPTION OF THE INVENTION

As the electron-donating colorless dyes of the present invention, there can be used all of the dyes previously disclosed for pressure- or heat-sensitive recording papers, for example, phthalide dyes, fluorane dyes, spiropyran dyes, diphenylmethane dyes, azine dyes, triarylmethane dyes and the like.

Examples of phthalide dyes include 3,3-bis(P-dimethylamino)-6-dimethylamino phthalide, 3-(P-dibenzylamino phenyl)-3-(1',2'-dimethyl-3-indolyl)-7-azaphthalide, 3,3-bis(4'-dimethylamino phenyl) phthalide, 3-(4-diethylamino-2-ethoxyphenyl)-3-(1-ethyl-2-methylindol-3-yl)-4-azaphthalide, 3-(4-diethylamino-2-ethoxyphenyl)-3-(1-ethyl-2-methylindol-3-yl)-7-azaphthalide, 3,3-bis(1-ethyl-2-methylindol-3-yl)-4-azaphthalide, 3,3-bis(1-ethyl-2-methylindol-3-yl)-7-azaphthalide, and 3,3-bis(1-ethyl-2-methylindol-3-yl) phthalide.

Examples of fluorane dyes include 3,6-dimethoxyfluorane, 4-amino-8-diethylaminobenzo[a] fluorane, 2-amino-8-diethylaminobenzo[a]-fluorane, 4-benzylamino-8-diethylaminobenzo[a] fluorane, 3-diethylamino-6-methylfluorane, 3-diethylamino-7-aminofluorane, 3-diethylamino-7-chlorofluorane, 3-diethylamino-5-methyl-7-t-butylfluorane, 3-diethylamino-6-methyl-7-chlorofluorane, 2-methyl-6-(N-p-tolyl-N-ethylamino)-fluorane, 10-diethylaminobenzo[c] fluorane, spiro(xanthene-9,1'-phthalan)-6-diethylamino-2-phenyl-3'-on, spiro(xanthene-9,1'-phthalan)-6-diethylamino-2-methoxy-3'-on, spiro(xanthene-9,1'-phthalan)-6-diethylamino-2-(N-methyl-N-acetoamino)-3'-on, 3-cyclohexylamino-6-chlorofluorane, 3-diethylaminobenzo[a] fluorane, 3-diethylamino-6,8-dimethylfluorane, 3-benzyamino-6-chlorofluorane, 3-cyclohexylamino-7-methylfluorane, 2-methoxy-8-diethylaminobenzo[c] fluorane, 3,6-bis(diethylamino) fluorane-γ-anilinolactam, 2-[3,6-bis(diethylamino)-9-(0-chloroanilino) xanthyl] benzoic acid lactam, 3,6-bis(diethylamino) fluorane-γ-(4'-nitro)-anilinolactam, 3-diethylamino-7-cyclohexylaminofluorane, 2-(N-phenyl-N-methylamino)-6-(N-p-tolyl-N-ethyl aminofluorane, 3-(N,N-diethylamino) 5-methyl-7-(N,N-dibenzylamino) fluorane.

2-mesidino-8-diethylaminobenzo[c] fluorane, spiro [xanthene-9,1'-phthalan]-2,6 bis(diethylamino) -3'-on, 3-N,N-diethylamino-7-methylaminofluorane, 3-diethylamino-6-methyl-7-alkyl ($C_{8-16}$) aminofluorane, 3-(N,N-diethylamino)-7-(N,N'-dibenzylamino) fluorane, 3-(N,N-diethylamino)-7-bis(dimethylbenzyl) aminofluorane, 3-diethylamino-7-N-cyclohexyl-N-benzylaminofluorane, 3-pyrolidino-7-cyclohexylaminofluorane, 3-diethylamino-6-methyl-7-p-butylanilinofluorane, 3-diethylamino-6-methyl-7-p-phenetidinofluorane, 3-diethylamino-6-methyl-7-anilinofluorane, 3-diethylamino-6-methyl-7-xylidinofluorane, 3-diethylamino-7-chloroanilinofluorane, 3-diethylamino 7-(2-carbomethoxyanilino) fluorane, 2-anilino-3-methyl-6-(N-ethyl-p-toluidino) fluorane, 2-p-toluidino-3-methyl-6-(N-ethyl-p-toluidino) fluorane, 3-(N-cyclohexyl-N-methylamino)-6-methyl-7-anilinofluorane, 3-pyrolidino-6-methyl-7-p-butylanilinofluorane, 3-pyrolidino-6-methyl-7-anilinofluorane, 3-pyrolidino-6-methyl-7-toluidinofluorane and 3-piperidinofluorane.

Examples of spiropyran dyes include 2,2'-spiro (benzo[f] chromene), spiro[3-methylchromene-2,2'-7'-diethylaminochromene], spiro[3-methyl-benzo(5,6-a) chromene-2,2'-7'-diethylaminochromene], spiro[3-methylchromene-2,2'-7'-dibenzylaminochromene] and 3-methyl-di-β-naphthospiropyran.

Examples of diphenylmethane dyes include 4,4'-bis(4,4'-tetramethyldiamino diphenylmethylamino) diphenylmethane, bis{4,4'-bis(dimethylaminobenzhydryl} ether, N,N'-bis[bis(4'-dimethylaminophenyl) methyl]-1,6-hexamethylene diamine, N-bis(4-dimethylaminophenyl) methylglycine ethyl ester and 4,4'-bis-dimethylaminobenzhydryl benzyl ether.

Examples of azine dyes include 3,7-bis(dimethylamino) 10-benzoylphenothiazine, 10-(3',4',5'-trimethoxy-benzoyl)-3,7-bis(dimethylamino) phenothiazine and 3-diethylamino-7 (N-methylanilino)-10-benzoylphenoxazine.

Examples of triarylmethane dyes include N-butyl-3-[bis{4-(N-methylanilino) phenyl} methyl] carbazole, 4H, 7-diethylamino-4,4'-bis(9'-ethyl-3'-methyl-6'-carbazolyl)-2-t-butyloylamino-3,1-benzothiazine, 4H-7-diethylamino-4-(p-diethylaminophenyl)-4-(9'-ethyl-3'-methyl-6'-carbazolyl)-2-pivaloylamino-3,1-benzothiazine, 4H-6-methyl-4,4-bis(p-dimethylaminophenyl)-2-pivaloyl-3,1-benzothiazine, 4H-7-dibenzylamino-4,4-bis(p-dimethylaminophenyl)-2-phenyl-3,1-benzothiazine, 4H-7-dibenzylamino-2-isobutoxy carbonylamino-4,4-bis(p-dimethylaminophenyl)-3,1-benzothazine, 4H-7-diethylamino-4,4-bis{p-[N-ethyl-N-(p-tolyl)]aminophenyl}-2-pivaloylamino-3,1-benzothiazine, 4H-6-methyl-4,4-bis(p-dimethylaminophenyl)-2-phenyl-3,1-benzoxazine, 1-oxy-1,3,3-tris(p-dimethylaminophenyl) phthalan.

Examples of the dyes used in the present invention include 7-chloro-1,3-dihydro-1,1-bis(p-dimethylaminophenyl)-3-oxisobenzo[b] thieno[2,3-c] furane, spiro{ chromeno[2,3-c]-4(H)-1'-phthalan}-7-diethylamino-3-methyl-1-(p-tolyl)-3'-on, spiro[11H-benzo[b] thieno[3,2-b] chromene-11,1'-phthalan]-3-diethylamino-7-methyl-3'-on, spiro[11H-benzo[b] thieno[3,2-6] chromene-11,1'-phthalan]-8-chloro-3-diethylamino-6-methyl-3'-on, lactone of 1-benzyl-2-(2-carboxy-4-dimethylaminophenyl)-2-hydroxyraphthostyryl, 2-(4'-hydroxystyryl)-3,3-dimethyl-3H-indol, 2-(4'-N-methyl-N-$\beta$-cyanoethylaminostyryl)-3,3-dimethyl-3H-indol and 7-dimethylamino-4-methylcumarin.

Due to the state of an electron-donating colorless dye dispersed in a hydrophobic liquid, it is an important aspect of the present invention how a uniform and stable dispersion is achieved without causing the prevention of the color-formation and of the encapsulation. The inventor has researched on this important feature and discovered that a uniform and stable dispersion can be prepared by using particular surfactants.

Cationic or amphoteric surfactants easily prevent color-formation. Anionic surfactants tend to form the color of a colorless dye. In contrast, non-ionic surfactants cause neither a self color forming nor the prevention of color-forming and thus are suitable for the present invention.

Among the non-ionic surfactants, the surfactants suitable for the present invention are, e.g. sorbitane fatty acid esters, such as sorbitan monolaurate, sorbitan monopalmitate, sorbitan sesquistearate, sorbitane monotall oil fatty acid ester, sorbitan monoisostearate, etc.; polyoxyethylene sorbit esters of fatty acids such as polyoxyethylene sorbit hexastearate, polyoxyethylene sorbit tetraoleate, etc; polyethylene glycol esters of fatty acids, such as polyoxyethylene monooleate, diethyleneglycol stearate, etc.; polyoxyethylene alkylphenyl esters such as polyoxyethylene nonylphenylether, polyoxyethylene octylphenylether, etc; derivatives of lanoline or bees wax such as polyoxyethylene sorbit bees wax, polyoxyethylene lanoline.

Further, the following surfactants can be used for obtaining the uniform and stable dispersion of an electron-donating colorless dye in a hydrophobic liquid, as well as the above nonionic surfactants: the so-called polymerized surfactants such as lauryl methacrylate/-diethylamino acrylate copolymer polymethacrylate, polyacryl amide, vinylcarboxylate/dialkyl fumarate copolymer, alkylpolysulfide, etc.; an oil-soluble polar compound of long-chain means an oil soluble compound having a polar phosphate or thiophosphate radical and a non-polar, long chain (C8–C30) hydrocarbon radical. Examples of such compounds are alkyl phosphates, alkyl phosphites, alkyl thiophosphates, di-alkyl dithiophosphates, fatty acid phosphates, fatty acid phosphites, fatty acid thiophosphates and metallic salts of these compounds. Suitable compounds are heptacosyl phosphate, eicosyl phosphite, octadecyl thiophosphate, didodecyl dithiophosphate, stearic acid phosphate, lauric acid phosphite, oleic acid thiophosphate, and Sn didodecyl dithiophosphate.

The surfactants used in the present invention can further include the above polymerized surfactants and oil-soluble polar compounds of long chain. Each of the nonionic surfactants and polar long-chain compounds can be used alone or with another compound.

The hydrophobic liquid for dispersing an electron-donating colorless dye includes natural and synthetic hydrophobic liquids which can be used alone or in combination. Examples of the hydrophobic liquid of the present invention include natural oils such as plant oils, animal oils, etc; petroleum destillate and derivatives thereof, such as machine oil, kerosine, paraffin, naphthene oil, etc; synthetic oils such as alkylbiphenyl, alkylterphenyl, chlorinated paraffin, alkyl-naphthalene, diphenyl alkane etc; and semi-synthetic oils.

The dispersing of the dye is carried out as follows. A certain amount of the electron-donating colorless dye is introduced into a hydrophobic liquid, and is dispersed by means of a dispersing machine without heating.

As the dispersing machine, there can be used, for example, a ball mill, sand mill, horizontal sand mill attritor, colloid mill, etc. It is suitable that the electron-donating colorless dye is dispersed in the hydrophobic liquid in a concentration of 2–60% by weight, preferably 10–50% by weight. With a concentration of less than 2% by weight, a sufficiently high color-formation is not obtained.

With a concentration of more than 60% by weight, the dispersing is insufficient and thus the dispersing time is too long or the mechanical treatment is difficult, which causes practical problems.

It is suitable that the hydrophobic liquid comprises the nonionic surfactant, the polymerized surfactant and/or the polar long-chain compound in a concentration of 2–40% by weight, preferably 5–35% by weight. With less than 2% by weight, the dispersing of dye is insufficient. With more than 40% by weight, the adjustment of emulsified particle size in the capsule-forming process after the dye-dispersing is difficult and the capsul wall tends to be insufficient.

The particle size of dye in the dye-dispersion is not otherwise limited. But with the particle size of less than 0.1$\mu$, the stability of the emulsified particles is reduced and the coagulation occurs easily, and with the particle size of more than 5$\mu$, color-formation is not sufficient and the smudging can be formed through dye-particles in application as a color-former for a pressure-sensitive recording paper. Accordingly, it is suitable to use a dye particle size of 1–5$\mu$, preferably 0.5–2$\mu$.

The electron-donating colorless dye dispersed in a hydrophobic liquid of the present invention can be colored, with the change of temperature or in contact with an electron-accepting color-developing agent, in the same way as the dye dissolved in a solvent. In the use as a temperature-indicating material, the color-former of the present invention is coated with a binder on a base material, and in the use as a top sheet for pressure-sensitive recording sheets, the color-former is coated with a binder and a buffer agent on a base sheet.

The color-former of the present invention can be used in the same way as the microcapsules comprising an electron-donating colorless dye dissolved in a solvent.

The microcapsules obtained by dispersing an electron-donating colorless dye in a hydrophobic liquid are not easily ruptured. The use as the temperature-indicating material or the color-former for a pressure-sensitive recording sheet, when coating the material of the present invention on a substrate, provides a clearly dense color-formation with little smudging and stable preservability in storage. The reason for the above excellent features is unclear. However, it is assumed that in the conventional dye-dissolution-type color-former, dye is deposited as crystals in the lapse of time, and the capsule wall is ruptured by a slight pressure of the end or corner of the obtained crystal.

EXAMPLE

The present invention will now be described in detail with reference to the following examples.

EXAMPLE 1

(1) Preparation of Dye-Dispersing Liquid 80 g of CVL as an electron-donating colorless dye, 40 g of sorbitan sesquistearate as a nonionic surfactant and 20 g of polymethyl methacrylate as a polymerized surfactant were added into 60 g of mineral turpentine oil as a hydrophobic liquid, and were dispersed to an average particle size of 1.2μ by means of a sand mill. 37.5 g of the dispersed liquid were added into a mixed oil of 60 g diaryl alkane oil (Hysol SAS 296, manufactured by Nisseki Chemical Co.) and 52.5 g isoparaffin-base oil (Isosol 400, manufactured by Nisseki Chemical Co.) to obtain a color-former dispersing liquid.

(2) Reaction for Forming Capsules 10 g of urea and 1.2 g of resorcinol were dissolved into 180 g of 5% aqueous solution of acrylic acid/styrene sodium sulfonate/butyl acrylate copolymer (average molecular weight: 900,000) and adjusted to a pH-value of 3.4.

"The color-former dispersion prepared by the above process (1) was added to this aqueous solution, and mixing by a HOMO-MIXER(manufacture by TOKUSHUKIKAKOUKYOU) was continued until the color-former dispersion having an average particle size of 4.5μ was obtained." 24 g of 37% formaldehyde solution were added thereto, heated under continued agitation for 3 hours, the reaction-solution was adjusted to pH-value of 7.5 by using 28% ammonium hydroxide solution, and the encapsulation was completed.

(3) Preparation of Color-Former for Pressure-Sensitive Recording Papers 30 g of starch, 30 g of SBR-latex and 465 g of water were added to 200 g of the above capsule liquid to prepare a coating liquid. The coating liquid was coated in a coating amount of 5 $g/m^2$ on a fine paper of 40 $g/m^2$ by using a meyer bar (No. 8). Thus, a color-former (top sheet) for pressure-sensitive recording sheets was obtained.

(4) Evaluation

The utility as pressure-sensitive recording papers were evaluated with regard to the following articles.

Color-Forming Velocity

A sheet (a top sheet) coated with microcapsules was laid on a bottom sheet (W-40-R, produced by JUJO PAPER CO., LTD.) and treated by a calender in a pressure of 50 $kg/cm^2$ to develop a color. After 6 seconds, Y-value of the color image was measured by means of Color-Difference Meter, and expressed as color-forming velocity. The smaller the value, the greater the color-forming velocity.

Image Density

A sheet coated with microcapsules was laid on the above bottom sheet and treated by a calender and pressure of 50 $kg/cm^2$ to develop a color. After 1 hour, Y-value of the color image was measured by means of Color-Difference Meter and expressed as image density. The smaller the value, the denser the image.

Smudging Under Static Pressure

A sheet coated with microcapsules was laid on the bottom sheet and treated by a calender and static pressure of 5 $kg/cm^2$ to develop a color. After 1 hour, Y-value of the color image was measured by means of Color-Difference Meter. The difference between the above Y-value and the Y-value of non color-developed part of the bottom sheet was expressed as smudging under static pressure. The smaller the value, the slighter the smudging.

Copying Ability

A sheet (top sheet) coated with microcapsules was laid on the bottom sheet. Also, 6 sheets were superposed and typewritten. The cleaness of the letter on the 6th sheet was determined by means of eyes.

EXAMPLE 2

A color-former for pressure-sensitive recording sheets was obtained in the same manner as in Example 1, except that 3,6-di-(N-dimethylaminofluorane-9-spiro-3'-(6'-dimethylamino) phthalide (Green 118, produced by Yamamoto Kagaku (0) was used as an electron-donating colorless dye.

EXAMPLE 3

80 g of 3-dimethylamino-6-methyl-7-anilinofluorane (ODB, produced by Yamamoto Kagaku Co.) as an electron-donating colorless dye, and 50 g of polyoxyethylene octylphenyl ether (nonionic surfactant) as a dispersing agent were added to 70 g of mineral and dispersed to a particle size of 0.75μ by means of colloidal mill. 37.5 g of the dispersed liquid were further dispersed in 62.5 g of dimethyl naphthalene oil (KMC-R, produced by Kureha Chemical Co.) to prepare a 15% dispersion of an electron-donating colorless dye. Then, the capsules and the color-former were obtained and evaluated in the same manner as in Example 1.

EXAMPLE 4

In Example 1-(1), 50 g of 3-cyclohexylamino-6-chlorofluorane (OR-55, produced by Yamada Kagaku Co.) as an electron-donating colorless dye and 20 g of dialkyl tindithiophosphate (an oil-soluble polar long-chain compound) as a dispersing agent were added to 30 g of plant oil (colza oil), and dispersed to an average particle size of 1.5μ by means of a sand mill. This dispersed liquid was added to 450 g of diaryl alkane oil (Hysol SAS 296), and further dispersed. 150 g of the obtained liquid were encapsulated in the same manner as in Example 1. Then, a top sheet for pressure-sensitive recording sheets was obtained and evaluated in the same way as in Example 1.

EXAMPLE 5

50 g of 5-hydroxy-10-(N-ethyl-N-p-tolylamino) fluorane as an electron-donating colorless dye and 15 g of polyoxyethylene lanoline as a nonionic surfactant were added to 35 of a paraffin base oil (Norpara H, produced by Nisseki Chemical Co.), and dispersed to an average particle size of 0.9μ with a sand mill, and diluted by using 450 g of a diaryl alkane oil (Hysol SAS 296). 150 g of the obtained liquid were encapsulated in the same way as in Example 1. A top sheet for pressure-sensitive recording sheets was obtained and evaluated in the same manner as in Example 1.

EXAMPLES 6 AND 7

Microcapsules and a top sheet for pressure-sensitive recording sheets were obtained and evaluated in the same manner as in Example 1, except that 4 g of a liquid dispersing CVL (Crystal Violet Lactone) (Example 6) or ODB (3-dimethylamino-6-methyl-7-anilinofluorane) (Example 7) in mineral turpentine oil were further dispersed in the solvent of Example 1 or 3, and thus a dispersed liquid having a dye concentration of 2.5% was used.

COMPARATIVE EXAMPLES 1 AND 2

CVL and ODB (as electron-donating colorless dyes) used in Examples 1 and 2 were added into a mixture of diaryl alkane oil and isoparaffin oil (a mixture of Hisol SAS 296 and Isosol 400) and a dimethyl-naphthalene oil (KMC-R) to provide dye concentrations of 10% and 15% in liquids, respectively, and then were heated and dissolved at 105° C., and finally were cooled to a room temperature. Although the dye was partly deposited, the encapsulation was carried out by following the procedures of Example 1-(2). Top sheets for pressure-sensitive recording sheets of blue color- and black color-formation were prepared and evaluated in the same manner as in Example 1.

The raw materials used in Examples 1-7 and Comparative Examples 1 and 2 were summarized in Table 1, and their evaluated results were indicated in Table 2. As clearly seen from Table 2, the Examples using as a color-former the dye-dispersion-capsules of the present invention provide practically sufficient abilities with respect to image density, color-forming velocity, smudge under static pressure and copying ability.

In a comparison of the color-former using mainly the dye-dispersion capsules of the present invention with the color-former using the conventional dye-dissolution-capsules (in comparison of Example 1 with Comparative Example 1 in blue-color-former, and in comparison of Example 3 with Comparative Example 2 in black-color former), the former is evidently superior to the latter in all of the evaluated abilities.

In Examples 2, 4 and 5 using the electron-donating colorless dyes with a poor solution-stability, the dye-dispersion capsules provide better effects in comparison with the dye-dissolution capsules giving an insufficient image density. In Examples 6, 7 and Comparative Examples 3, 4 using the electron-donating colorless dyes with a good solution-stability, the dye-dispersion-capsules provide the same effects as the dye-dissolution capsules.

EXAMPLE 8

Preparation of Temperature-Indicating Sheet (1) Preparation of Color Heat-Changeable Material 30 g of CVL as an electron-donating colorless dye were added into a solution dissolving 60 g of acethyl acid phosphate (as a nonionic surfactant and hydrophobic liquid) in 110 g of a isoparaffin oil (Isosol 300, made by Nisseki Chemical Co.), and were dispersed to an average particle size of 1.7μ by means of a ball mill.

(2) 100 g of the above dispersion were dispersed in 100 g of 5% aqueous solution of an acrylic acid-sodium styrensulfonate-butylacrylate copolymer (an average molecular weight: circa 900,000) which have been adjusted to a pH-value of 4 to prepare an o/w-emulsion having an average particle size of 5.5μ. On the other hand, a mixture of 6 g of melamine, 11 g of 37% aqueous formaldehyde solution and 83 g of water were heated and stirred at 60° C. After 30 minutes, an aqueous solution of melamine-formaldehyde-precondensate was obtained. This precondensate was added to the above o/w-emulsion, and was adjusted under mixing with agitation to a pH-value of 5.0 by using a 20% aqueous citric acid. The obtained liquid was heated to 60° C., held at 60° C. for 2 hours, and then adjusted to a pH-value 7.5 with a 28% aqueous ammonia solution to complete the process for forming capsules.

(3) Production of a Temperature-Indicating Sheet 15 g of the capsules containing the above color heat-changeable material, 35 g of a 1% aqueous polyvinylalcohol solution and 50 g of SBR-latex (48% solid) were mixed to prepare a coating material. The coating material was applied to a coated material, whereby a brown color heat-changeable sheet was obtained. The obtained sheet was placed in a polyethylene sack and hanged in a water bath. In heating the bath, the sheet is turned clearly blue at 65° C. The blue sheet was returned to a pale-yellow brown color at circa 61° C. Thus, a reversible temperature indicating material was obtained.

COMPARATIVE EXAMPLE 3

Instead of the dye-dispersion, 15 g of CVL and 95 g of cetylic acid phosphate were heated and dissolved at 80° C. and cooled to a room temperature. In this case, the dye was deposited, the entire system was coagulated in a solid state and thus the encapsulation was impossible. Also, the system was again heated, dissolved to 80° C. again, and then held at 75° C. Capsules containing a color heat-changeable material were prepared in the same manner as in Example 8, except that the capsules-forming temperature is 75° C. The obtained capsules had a poor particle size distribution. The color heat-changeable sheet, which was produced in the same way as in Example 8 by the application on a coated sheet, provides only a partial color-formation with unclear hue.

The raw materials used in Examples and Comparative Examples are summarized in Table 1.

TABLE 1

| | Dye | Nonionic surfactant | Solvent in encapsulation | dye-concentration in encapsulation |
|---|---|---|---|---|
| Example | | | | |
| 1 | CVL | •Sorbitan sesquistearate | SAS-296 | 10% |
| | | •Polymethyl-methacrylate | Isosol 400 | |
| 2 | Green 118 3,6-Di(N-dimethyl-amino) fluorene-9-spiro-3'-(6'-dimethyl-amino) phthalide | •Sorbitan sesquistearate | SAS-296 | 10% |
| | | •Polymethyl-methacrylate | Isosol 400 | |

TABLE 1-continued

| | Dye | Nonionic surfactant | Solvent in encapsulation | dye-concentration in encapsulation |
|---|---|---|---|---|
| 3 | ODB 3-Diethylamino-6-methyl-7-anilino-fluorane | •Polyoxyethylene-octyl phenylether | KMC-R | 15% |
| 4 | OR-55 3-Cyclohexylamino-6-chlorofluorane | •Sn-Dialkyldithio-phosphate | SAS-296 | 10% |
| 5 | 5-Hydroxy-10-(N-ethyl-N-p-tolylamino) fluorane | •Polyoxyethylene lanoline | SAS-296 | 10% |
| 6 | CVL | •Sorbitan sesquistearate | SAS-296 | 2.5% |
| | | •Polymethyl-methacrylate | Isosol 400 | |
| 7 | ODB | •Polyoxyethylene octyl phenylether | KMC-R | 2.5% |
| Comparative Example | | | | |
| 1 | CVL | — | SAS-296 Isosol 400 | 10% |
| 2 | ODB | — | KMC-R | 15% |
| Example | | | | |
| 8 | CVL | •Acethyl acid phosphate | Isosol 300 | 15% |
| Comparative Example | | | | |
| 3 | CVL | — | Acethyl acid phosphate | 5% |

TABLE 2

| Properties of pressure-sensitive recording papers | | | | |
|---|---|---|---|---|
| | Color-forming velosity | Image density | Smudging under static pressure | Copying ability |
| Example | | | | |
| 1 | 25 | 23 | 6.2 | Very clear |
| 2 | 36.5 | 33.3 | 3.8 | Clear |
| 3 | 37.7 | 30.5 | 4.2 | Very clear |
| 4 | 40.4 | 37.6 | 3.3 | Clear |
| 5 | 46.3 | 44.2 | 2.1 | Clear |
| 6 | 31.6 | 28.5 | 4.4 | Unclear |
| 7 | 47.9 | 36.1 | 3.2 | Unclear |
| Comparative Example | | | | |
| 1 | 29 | 27 | 7.3 | Unclear |
| 2 | 41.1 | 36.1 | 4.7 | Unclear |

| Property of a temperature-indicating sheet | Clearness of color-formation (by eyes) |
|---|---|
| Example 8 | Very clear |
| Comparative Example 3 | Unclear |

The color-former of the present invention provides the following superior effects, compared with the conventional color-former obtained by a dye dissolved in a solvent.

(1) The dispersant of a high dye concentration and the colored image of a high density and resolution can be obtained.

(2) Since many kinds of dyes, which were previously impossible to be employed owing to the absence of suitable solvents, can be used, the previously impossible hue can be obtained.

(3) Since more kinds of solvents can be chosen, non-aromatic hydrophobic liquids with a high safety can be used.

(4) Although the conventional dye-dissolution capsules cause dye-deposition with an elapsed time, the dye-dispersing capsules prevent the dye-deposition and thus prevent the problem of smudging a coated surface owing to the deposited crystal.

We claim:

1. A color-former mainly comprising microcapsules having a core comprising an electron-donating colorless dye and a hydrophobic liquid, said hydrophobic liquid comprising a hydrophobic solvent and an oil-soluble nonionic surfactant, said electron-donating colorless dye being dispersed in said hydrophobic liquid with an average particle diameter of 0.1 to 5 μm.

2. The color-former according to claim 1, wherein said electron-donating colorless dye is dispersed in said hydrophobic liquid in a concentration of 2–60% by weight.

3. The color-former according to claim 1, wherein said nonionic surfactant is 2–40% by weight in said hydrophobic liquid.

4. The color-former according to claim 3, wherein said electron-donating colorless dye has an average particle size of 0.5–2μ.

5. The color-former according to claim 1, wherein said hydrophobic liquid further comprises a polymerized surfactant.

6. The color-former according to claim 1, wherein said hydrophobic liquid further comprises an oil-soluble polar compound having a C8–C30 hydrocarbon chain.

7. The color-former according to claim 1, wherein said nonionic surfactant is at least one surfactant selected from the group consisting of sorbitan fatty acid esters, polyoxyethylene sorbitan esters of fatty acids, polyethylene glycol esters of fatty acids, polyoxyethylene alkylphenyl ethers, polyoxyethylene lanoline and polyoxyethylene sorbitan bees wax.

* * * * *